United States Patent
Blinick et al.

(10) Patent No.: US 7,936,767 B2
(45) Date of Patent: May 3, 2011

(54) SYSTEMS AND METHODS FOR MONITORING HIGH SPEED NETWORK TRAFFIC VIA SEQUENTIALLY MULTIPLEXED DATA STREAMS

(75) Inventors: Katherine T. Blinick, Tucson, AZ (US);
John C. Elliott, Tucson, AZ (US);
Gregg S Lucas, Tucson, AZ (US);
Robert E. Medlin, Tucson, AZ (US);
Gordon L. Washburn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/741,798

(22) Filed: Apr. 30, 2007

(65) Prior Publication Data

US 2008/0267192 A1     Oct. 30, 2008

(51) Int. Cl.
H04L 12/28         (2006.01)

(52) U.S. Cl. .................. 370/395.7; 370/392; 370/404; 370/412; 711/114; 711/154; 711/152

(58) Field of Classification Search .................. 370/386, 370/389, 360, 422, 465, 252, 347, 412, 216, 370/217, 351–352, 392–395, 419; 710/5, 710/20, 255, 11; 709/223, 208, 250, 220, 709/222; 711/114, 15, 154, 152
See application file for complete search history.

(56) References Cited

U.S. PATENT DOCUMENTS

| | | | |
|---|---|---|---|
| 4,451,916 A | | 5/1984 | Casper et al. |
| 4,633,473 A | | 12/1986 | Ratchford et al. |
| 5,257,393 A | | 10/1993 | Miller |
| 5,712,856 A | * | 1/1998 | Finney et al. .............. 714/712 |
| 6,427,132 B1 | | 7/2002 | Bowman-Amuah |
| 6,549,539 B1 | * | 4/2003 | Neyman ..................... 370/401 |
| 6,625,144 B1 | | 9/2003 | El-Batal et al. |
| 7,010,607 B1 | | 3/2006 | Bunton |
| 7,047,374 B2 | | 5/2006 | Sah et al. |
| 7,079,482 B2 | | 7/2006 | Moore et al. |
| 7,107,273 B2 | | 9/2006 | Ohata et al. |
| 7,120,557 B2 | | 10/2006 | Schmitz et al. |
| 7,151,772 B1 | | 12/2006 | Kalmanek, Jr. et al. |

(Continued)

FOREIGN PATENT DOCUMENTS

EP            1772992 A1       4/2007

(Continued)

OTHER PUBLICATIONS

International Search Report and Written Opinion for International Application No. PCT/EP2008/054220 filed Nov. 18, 2008.

*Primary Examiner* — Pankaj Kumar

*Assistant Examiner* — Anez Ebrahim

(74) *Attorney, Agent, or Firm* — Cantor Colburn LLP; Randall Bluestone

(57) ABSTRACT

Systems and methods for monitoring high-speed network traffic via sequentially multiplexed data streams. Exemplary embodiments include a switch module system, including a first switch module configured to be coupled to a first server chassis, a first data port disposed on the first switch module and a set of first port data links configured to be coupled to a set of data port data links, each data link configurable to channel at least one of a normal data stream and a monitored data stream.

20 Claims, 8 Drawing Sheets

U.S. PATENT DOCUMENTS

| | | |
|---|---|---|
| 7,380,163 B2 | 5/2008 | Davies et al. |
| 7,382,790 B2 | 6/2008 | Warren et al. |
| 7,457,925 B2 | 11/2008 | Fujino |
| 2002/0016868 A1 | 2/2002 | Peacock |
| 2002/0095660 A1* | 7/2002 | O'Brien et al. ............... 717/127 |
| 2003/0065733 A1 | 4/2003 | Pecone |
| 2004/0078711 A1 | 4/2004 | King et al. |
| 2004/0085974 A1 | 5/2004 | Mies et al. |
| 2004/0085994 A1 | 5/2004 | Warren et al. |
| 2004/0139168 A1 | 7/2004 | Tanaka et al. |
| 2005/0041665 A1 | 2/2005 | Weyman et al. |
| 2005/0053073 A1 | 3/2005 | Kloth et al. |
| 2005/0055435 A1 | 3/2005 | Gbadegesin et al. |
| 2005/0080948 A1 | 4/2005 | Rowlands |
| 2005/0223269 A1 | 10/2005 | Stolowitz |
| 2006/0047850 A1* | 3/2006 | Singh Bhasin et al. ....... 709/238 |
| 2006/0047908 A1 | 3/2006 | Chikusa et al. |
| 2006/0061369 A1 | 3/2006 | Marks et al. |
| 2006/0078334 A1* | 4/2006 | Graves et al. ................... 398/45 |
| 2006/0095599 A1 | 5/2006 | Douglas et al. |
| 2006/0227776 A1* | 10/2006 | Chandrasekaran ........... 370/389 |
| 2006/0230125 A1 | 10/2006 | Johnson |
| 2006/0236198 A1 | 10/2006 | Lintz et al. |
| 2007/0211640 A1 | 9/2007 | Palacharla et al. |
| 2007/0212065 A1* | 9/2007 | Shin et al. ....................... 398/45 |

FOREIGN PATENT DOCUMENTS

| | | |
|---|---|---|
| JP | 10093604 | 4/1998 |
| JP | 10154989 A | 6/1998 |
| JP | 11275128 | 10/1999 |
| JP | 20060268093 A | 10/2006 |
| WO | 01/63838 A2 | 8/2001 |

* cited by examiner

SYSTEMS AND METHODS FOR MONITORING HIGH SPEED NETWORK TRAFFIC VIA SEQUENTIALLY MULTIPLEXED DATA STREAMS

TRADEMARKS

IBM® and BladeCenter® are registered trademarks of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to storage network systems, and particularly to systems and methods for monitoring high-speed network traffic via sequentially multiplexed data streams.

2. Description of Background

In storage network systems such as illustrated in FIG. 1, which have internalized high-speed fabrics, a high-speed switch is used to provide connectivity amongst individual servers and associated storage. In addition, such network storage systems can include multiple high-speed fabrics (1× and 4×), High-speed, differential signaling is used to provide high bandwidth connections between a central serial attached SCSI (SAS) switch and other endpoints such as other switches or downstream or upstream storage components, SAS can implement several configurations, such as fiber channel, Ethernet, SCSI, etc., and several topologies, such as 16 external SAS ports, which can be "wide" or "narrow". A wide port can include single 1× links (e.g., PHYs) or multiple links for a 4×, 8×, 12×, etc., wide port.

In such systems, much of the storage area network (SAN) is internalized, wherein the server blades and the switch modules are coupled to one another via internal fabric. Such internalization can create problems that require access to pertinent data for problem detection, analysis and fault isolation. In some SAN systems, test equipment (e.g., a logic analyzer) can be inserted or onto a suspected high-speed interlace such as the external fiber channel and capture pertinent data for problem resolution. However, when high-speed fabrics are internalized, it becomes difficult to access the fabric for troubleshooting problems. Although solutions, such as creating software trace events in microcode and directing error messages to a debug port, have been implemented, such solutions have shortcomings, including inaccurate detail of the failure, non real-time reporting of the failure, and resultant numerous iterations of adding a debug patch to isolate the problem. Other more invasive methods can include adding wires to a card to allow internal probing. This hardware-type approach is invasive to the system, limiting in analysis capability, and can cause potential corruption of the monitored date. In other instances, permanent electrical damage to the probed fabric circuitry can result. Although many of these approaches can be implemented in a controlled laboratory setting, these approaches are unsuitable for & customer environment. Therefore, there exists a need for systems and methods to troubleshoot internalized high-speed fabric networks in a customer environment.

BRIEF SUMMARY

Exemplary embodiments include a switch module system, including a first switch module configured to be coupled to a first server chassis, a first data port disposed on the first switch module and a set of first port data links configured to be coupled to a set of data port data links, each data link configurable to channel at least one of a normal data stream and a monitored data stream.

Further embodiments include a computer-readable medium having computer-executable instructions for performing a method, including configuring a multi-chassis system, configured to support a server and a switch module to run data streams for the server and over the switch module, detecting a data failure on at least one data link coupled to the switch module, configuring a second and third data link coupled to the switch module, to receive monitored data streams and configuring at least one of the first data link and a fourth data link data link to support unaffected data streams.

Additional embodiments include a switch module data monitoring method, including configuring a multi-chassis system to run data streams over a switch module interconnecting the multi-chassis system, detecting a data failure on at least one data link coupled to the switch module, configuring a second and third data link coupled to the switch module, to receive monitored data streams, configuring at least one of the first data link and a fourth data link data link to support unaffected data streams and routing the monitored data streams to a logic analyzer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, real-time tracing and troubleshooting of internal high speed fabric problems in a system configuration where all external SAS links are consumed running normal SAS I/O is achieved.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments include systems and methods for monitoring high-speed network traffic via sequentially multiplexed data streams wherein SAS switches provide wide ports to aggregate bandwidth consisting of multiple links (e.g., PHYS) within a single cable. As such, according to exemplary embodiments, a snooping method can be implemented on a high-speed SAS wide port such that when a traffic failure is detected, all I/O streams are directed to a common data link (PHY), whereby the switch multiplexes the different traffic streams. In exemplary implementations, multiple initiators access a common storage domain (enclosure) via a single wide port. As such, multiple I/O traffic streams are multiplexed across the wide port. When a traffic failure is detected, all I/O streams are directed to a common link whereby the switch multiplexes the different traffic streams. This configuration leaves the other links in the wide port available for providing snoop data connections to an external logic analyzer for problem determination. The available links are configured as snoop ports whereby selective I/O traffic can be routed via specific snoop ports to a logic analyzer.

According to exemplary embodiments, adaptive snooping, given a wide port, can transfer a block of data amongst all the data links associated with the port. Since trying to capture a failure on any given port may be difficult if a data link exceeds an error threshold limit, its traffic is rerouted to another data link associated with that wide port. If a logic analyzer is set up to trace one data link, it is unlikely to capture the data of interest. Within the expander an algorithm is implemented that monitors for increasingly high hardware failures on the data links. If a wide port is experiencing problems, then the systems and methods can adaptively redirect all data link traffic to a single data link that is least faulty, i.e. the highest priority (stable) data link, as discussed further in the description below.

Figure 1:
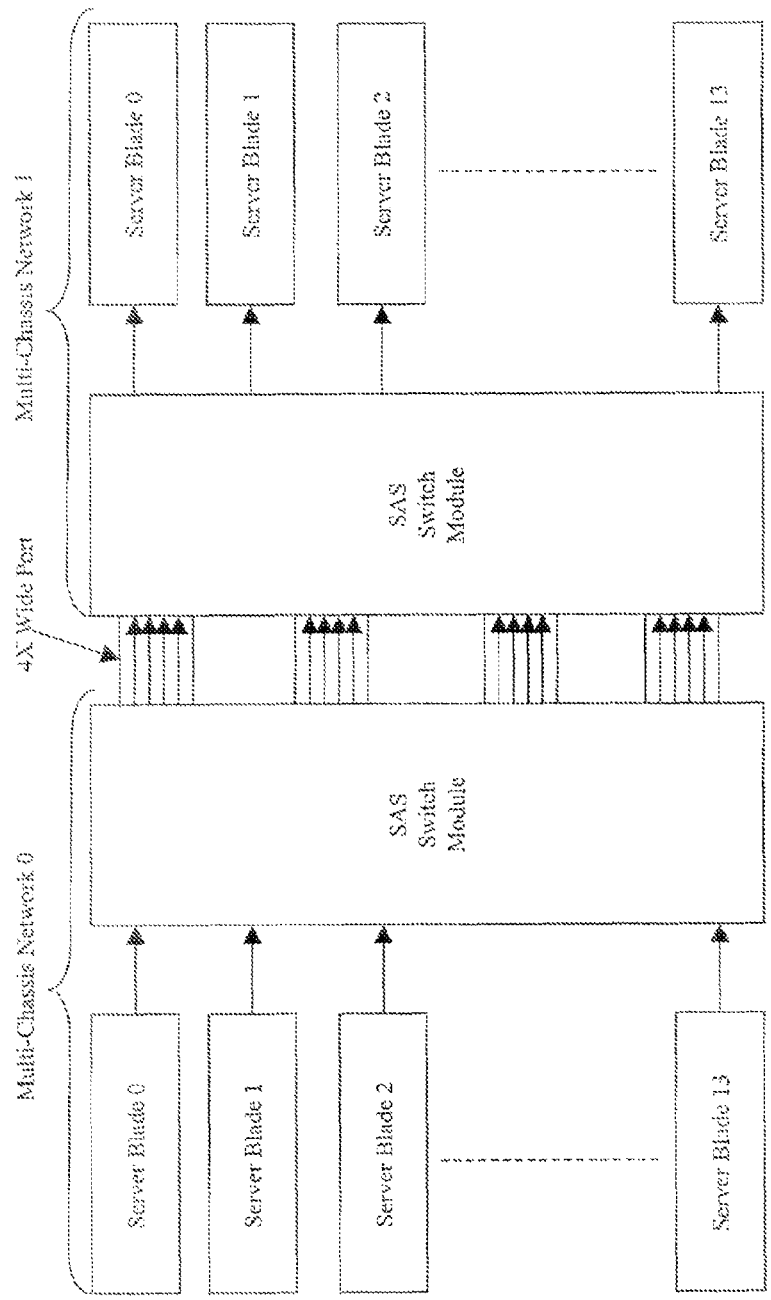
FIG. 1 illustrates an example of a prior art SAS storage network having two multi-chassis networks, each having fourteen blade servers.
Figure 2:
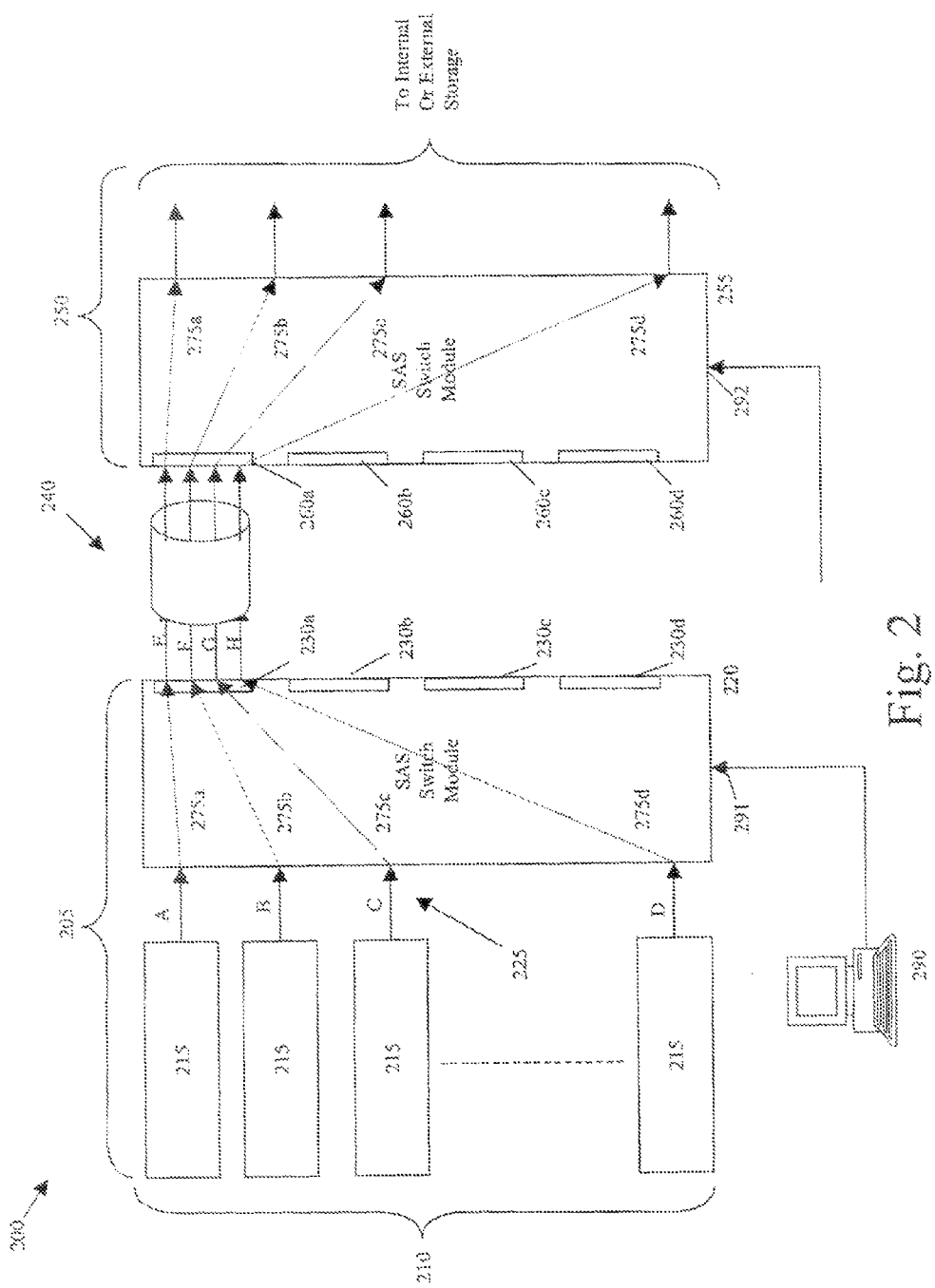
FIG. 2 illustrates one example of a SAS storage network system configured in accordance with exemplary embodiments.

FIG. 2 illustrates one example of a SAS storage network system 200 configured in accordance with exemplary embodiments. The system 200 can include a first chassis network 205 having a first chassis 210 with multiple independent servers 215 (i.e., server blades), each independent server 215 having, among other things, a blade controller and an I/O controller. The first chassis 210 is coupled to and in communication with a first switch module 220. The first chassis 210 is coupled to the first switch module 220 through internal fabric 225, which can be single links A, B, C, D (e.g., 1×) between each independent server 215 and an input of the first switch module 220. The first switch module 220, which can be a SAS switch module, can, among other things, route and switch network, data traffic to external fabric 240 via various wide ports 230*a*, 230*b*, 230*c*, 230*d* and/or individual data links, such as links E, F, G, H. In the example shown in FIG. 2, a single wide port 230*a* is illustrated having four individual links E, F, G, H, thereby forming a 4× wide port, that is, wide port 230*a*. It is understood and appreciated that in other embodiments, the external fabric 240 can support any combination of data links and wide ports, such as but not limited to multiple single 1× links or other wide port configurations, including but not limited to, 8×, 12×, 16×, etc. It is further appreciated that first switch module 220 is routing data streams 275*a*, 275*b*, 275*c*, 275*d* from independent servers 215 to external fabric 240.

The system 200 further includes a second chassis network 250, having a second switch module 255, having wide ports 260*a*, 260*b*, 260*c*, 260*d* and the data links E, F, G, H, and coupled to the first switch module 220 via the external fabric 240. It is appreciated that the external fabric 240, which can be a fiber cable, Ethernet Cable, SCSI cable, etc., is the medium that couples the wide ports 230, 260, via individual links E, F, G, H, to one another. The second switch module 255 can be coupled to and in communication with other internal or external storage such as, but not limited to, a second network chassis, a switch bunch of disks (SBOD), etc. It is further appreciated that any number of additional chassis networks, or other storage network media can be coupled to and in communication with the first and second chassis networks 205, 250, either upstream or downstream.

In general, high-speed switch technology provides the ability to selectively and redundantly mirror high-speed traffic to ports (e.g., wide ports, individual data links, etc.) on the same switch. For example, one or more of the wide ports 230*a*, 230*b*, 230*c*, 230*d* (or individual data links E, F, G, H) on first switch module 220 can be configured to monitor the other wide ports 230*a*, 230*b*, 230*c*, 230*d* (or individual data links E, F, G, H) on the first switch module 220. Such use of the wide ports 230*a*, 230*b*, 230*c*, 230*d* and/or data links E, F, G, H is now described in accordance with exemplary embodiments. This monitoring feature is also known as "snooping", that is, high-speed traffic in progress through, for example, the first switch module 220 can be "snooped" or monitored and then directed to yet another port on the first switch module 220, that is, the port being dedicated for snooping. It is appreciated that, in order to have a snooping port or link, the first switch module 220 has available ports or links for snooping. In the system 200 illustrated in FIG. 2, all external switch ports can be used for SAS I/O traffic. In an exemplary embodiment, the wide port 230*a* can include several data links such and can support data streams. FIG. 2, as an example, illustrates that each of the four server blades 215 is accessing the external storage, in this case via second switch module 255, and through respective links E, F, G, H within the wide port 230*a*. Further, it is appreciated that the first switch module 220 may dynamically route (distribute) the server traffic (data streams 275*a*-275*d*) across all links, such as links E, F, G, H within a wide port, such as wide port 230*a*, in various ways. As such, it is non-deterministic as to which I/O stream is routed through which link. Therefore, FIG. 2 illustrates a pre-cursor configuration to exemplary systems and methods for monitoring high-speed network traffic via sequentially multiplexed data streams.

Figure 3:
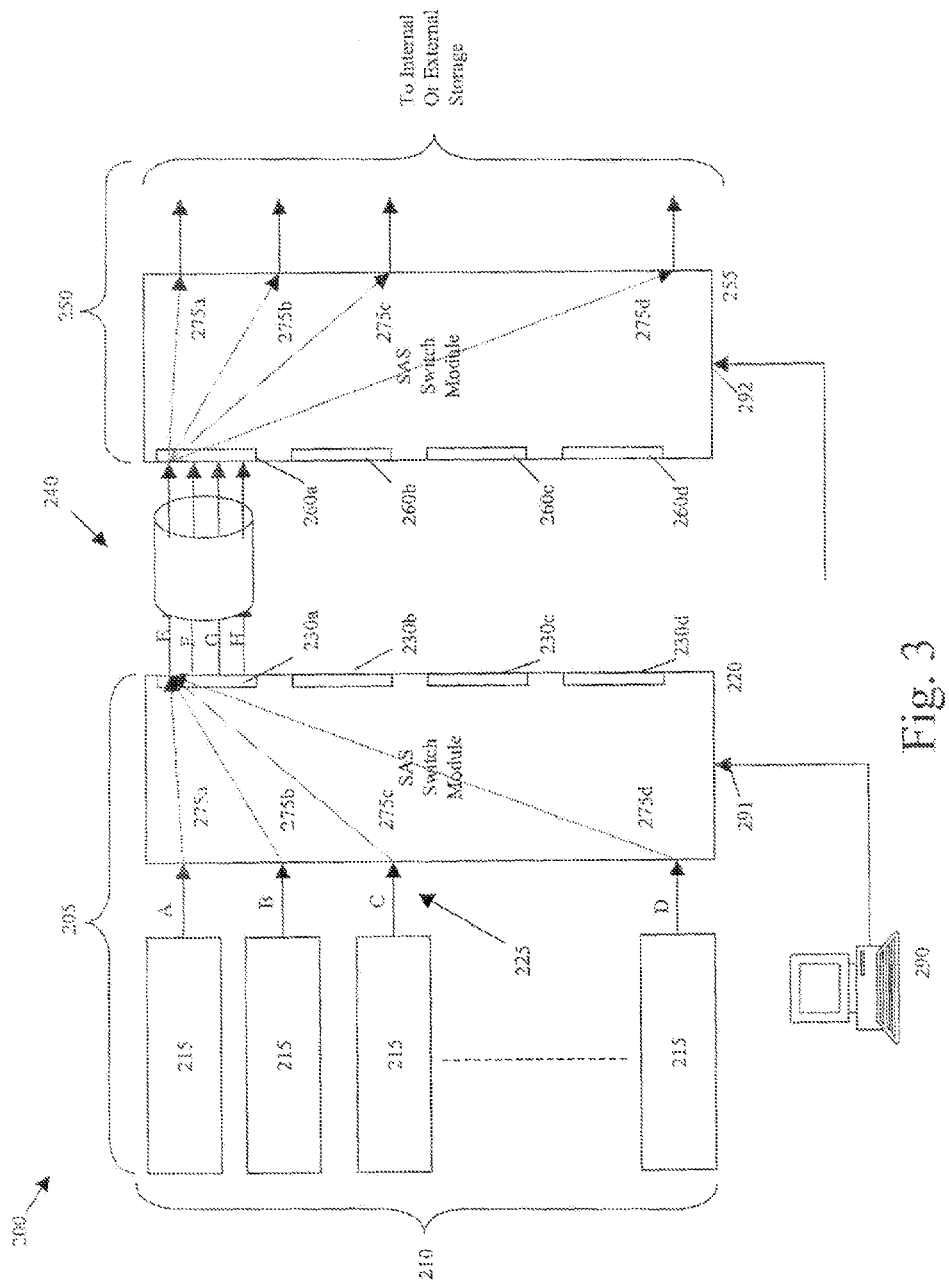
FIG. 3 illustrates the example of the SAS storage network system of FIG. 2 configured in accordance with exemplary embodiments.

FIG. 3 illustrates the example of the SAS storage network system 200 of FIG. 2 configured in accordance with exemplary embodiments. When troubleshooting system I/O problems it is necessary to capture a trace of the I/O activity in real time. As such a logic analyzer 270 can be coupled to the system 200 for monitoring the I/O. In an exemplary embodiment, all I/O traffic, that is, all data streams 275*a*-275*d* is routed to a single link E within the wide port 230*a*. It is appreciated that in other exemplary embodiments and implementations, the I/O traffic can be routed to other links and wide ports. By routing all I/O traffic to a single link, the remaining links F, G, H in the wide 230*a* are tree of data traffic. Furthermore, by re-routing the data streams 275*a*-275*d* onto the single link E, it is ensured that the I/O that is failing is routed on a single link E that is capable of being monitored. It is appreciated that several data rates such as 3 Gb/s and 6 Gb/s are contemplated as being supported on data links E, F, G, H in exemplary embodiments. As such, if for example, all data streams 275a-275b flow at a rate of 3 Gb/s, then the link E can be configured at 3 Gb/s, thereby allowing traffic to flow on the link sequentially. For example, data stream 275a is transferred on data link E, then data stream 275b is transferred on data link E, then data stream 275c is transferred on data link E, and then data stream 275d is transferred on data link E. All configurations as just discussed can be made via external computing device 290 coupled to debugging port 291.

Figure 4:
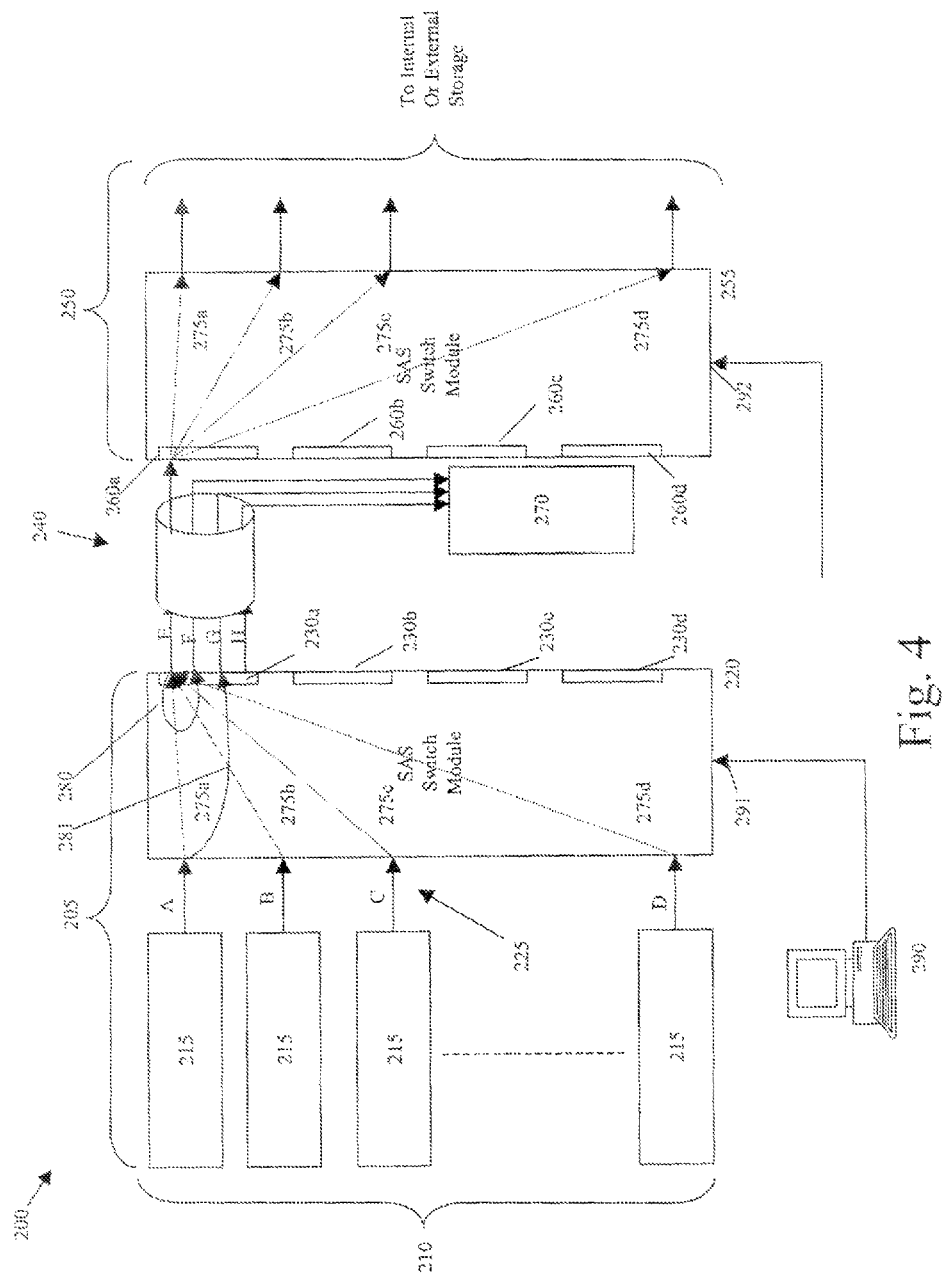
FIG. 4 illustrates the example of the SAS storage network system of FIGS. 2 and 3 configured in accordance with exemplary embodiments.

FIG. 4 illustrates the example of the SAS storage network system 200 of FIGS. 2 and 3 configured in accordance with exemplary embodiments. Two links F, G of three unused links F, G, H can be further configured as snoop links. In this example, the failing I/O has been determined to be from the independent server 215 with data stream 275a. In an exemplary implementation, to debug the problem, the data stream 275a going into the first switch module 220 via port A, and the data stream 275a leaving the first switch module 220 via data link E is monitored. As shown in FIG. 4, these two paths are routed to links F, G, as snooped data streams 280, 281, respectively. As such, in the configuration shown in FIG. 4, the data stream 281 represents the data stream prior to entering the first switch module 220, and the data stream 280 represents the data stream after it has flowed from the first switch module 220. In such a configuration, the external fabric used is a breakout cable that allows link E to flow between wide port 230a and wide port 260a. The remaining links F, G, H, however, are routed to the logic analyzer 270 for analysis.

Therefore, at some point link A traffic is transferring incorrect data causing an I/O failure. The problem could be incoming data from an independent server 215 in chassis 210 or data that is exiting the first switch module 220 on link E. Therefore, in order to isolate the fault, the stream 275a prior to entering first switch module 220 and after entering first switch module 220 are of interest to be captured by the logic analyzer 270, and routed as discussed. It is further appreciated that all data traffic from links A, B, C, D is routed to link E. However, in configurations in which the railed data has been identified as being, for example, on link A, all remaining traffic 275b, 273c, 275d, can be routed for normal operation, as now discussed.

Figure 5:
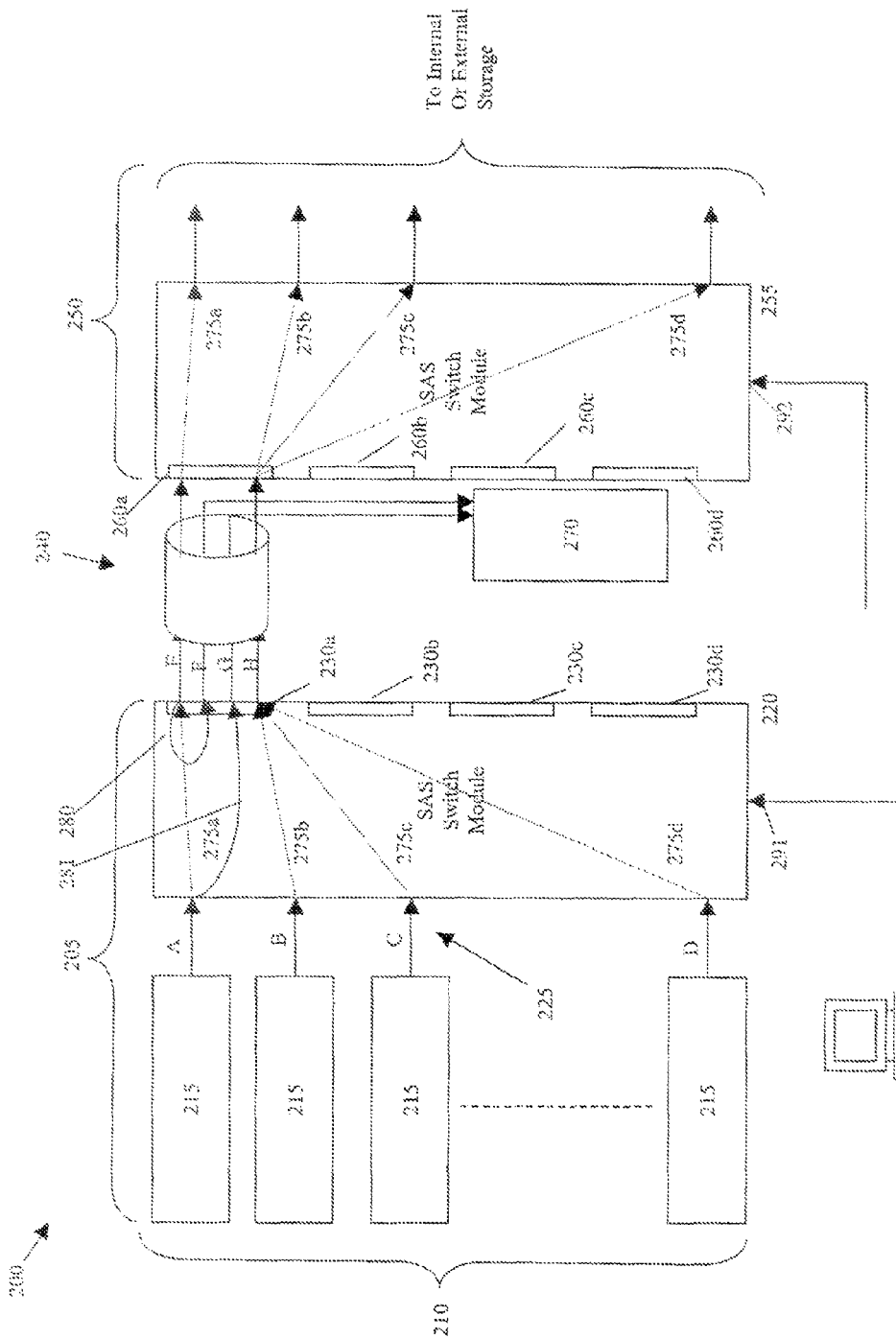
FIG. 5 illustrates the example of the SAS storage network system of FIGS. 2 and 3 configured in accordance with exemplary embodiments.

FIG. 5 illustrates the example of the SAS storage network system 200 of FIGS. 2 and 3 configured in accordance with exemplary embodiments. As discussed, external computing device 290 can be used to configure the system 200 to dynamically route the data streams 275b, 275c, 275d from the independent servers 215 in the first switch module 220. In the general ease, each independent server 215 is routed to a specific link, but if a link fails, its data can be re-routed to one of the remaining operational links. Thus, at any time it may not be known which data is going out on which link. Therefore, as discussed with respect to FIG. 4, all traffic should be funneled to a single link E and that link is required to be an operational link. In the current example, the data stream 275a on link A, flows through the first switch module 220 and out on link E has an error as detected by the first switch module 220 or on the second switch module 255. However, the link E is still operational and can reliably transfer data out link E. Thus, the other data streams 275b, 275c, 275d that are all redirected thru link E are still operational and unaffected by the corrupted data stream 275a on the link path A->E. In an exemplary embodiment, once a failing path is determined, that is, link a data stream 275a, the first switch module 220 may be specifically configured via external computing device 290, to statically route the data traffic through, a specific link to the second switch module 255. By rerouting the unaffected data traffic, the failed operation is constrained to a fixed path for troubleshooting. The other known good data transfers 275b, 275c, 275d from the other independent servers 215 can ah be tunneled to a known good link. e.g. Link H. For this example then, the corrupted data stream 275a on link A is routed through link E to the second switch module 255. The two snooped data streams 280, 281 are routed to links F, G, as discussed. The remaining data traffic 275b, 275c, 275d is all routed to link H. As discussed above, it is appreciated that the data streams 275b, 275c, 275d are transferred sequentially on data link H.

It is appreciated that the configurations discussed with respect to FIGS. 4 and 5 include an intervention to the system 200 by replacing an external breakout cable for the external fabric 240. As discussed, configurations can be done in real time to route data traffic as needed. In still another exemplary embodiment, a configuration can be done in real time during normal operation of the system 200 without any disruptions, as now discussed.

Figure 6:
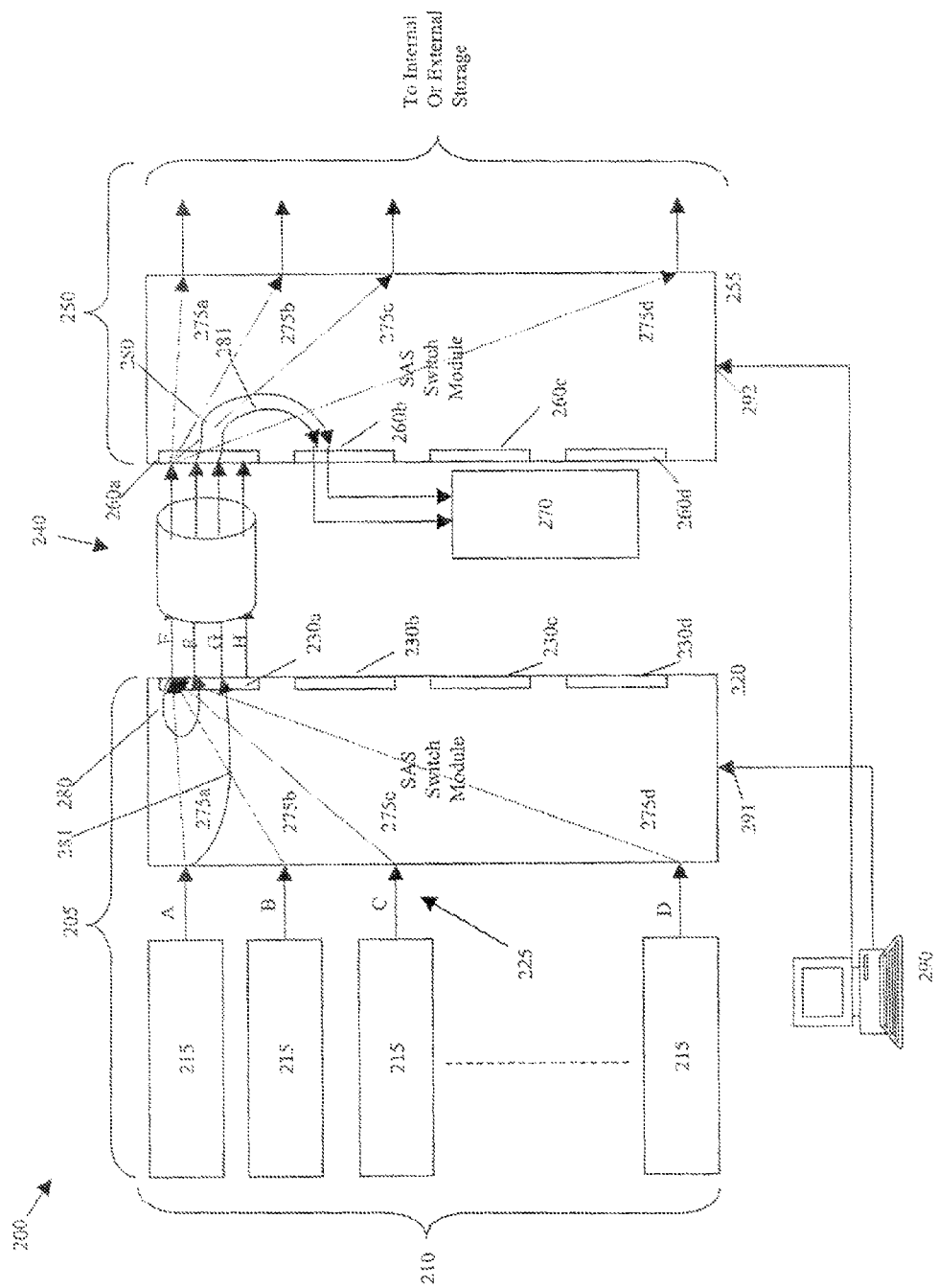
FIG. 6 illustrates the example of the SAS storage network system of FIGS. 2 and 3 configured in accordance with alternate exemplary embodiments.

FIG. 6 illustrates the example of the SAS storage network system 200 of FIGS. 2 and 3 configured in accordance with alternate exemplary embodiments. In the system 200 configured as shown, the external fabric 240 is not disrupted. Instead, the snoop data streams 280, 281 are routed onto links E, F as discussed previously but are further routed into the second switch module 255. All other data streams 275a, 275b, 275c, 275d are routed on link E as discussed previously. External computing device 290 coupled to debug port 292 configures links F, G to be re-routed to wide port 260b from wide port 260a to the logic analyzer 270, which is now connected to wide port 260b. This configuration can be done in real time during normal operation of the system 200 without any disruptions.

Figure 7:
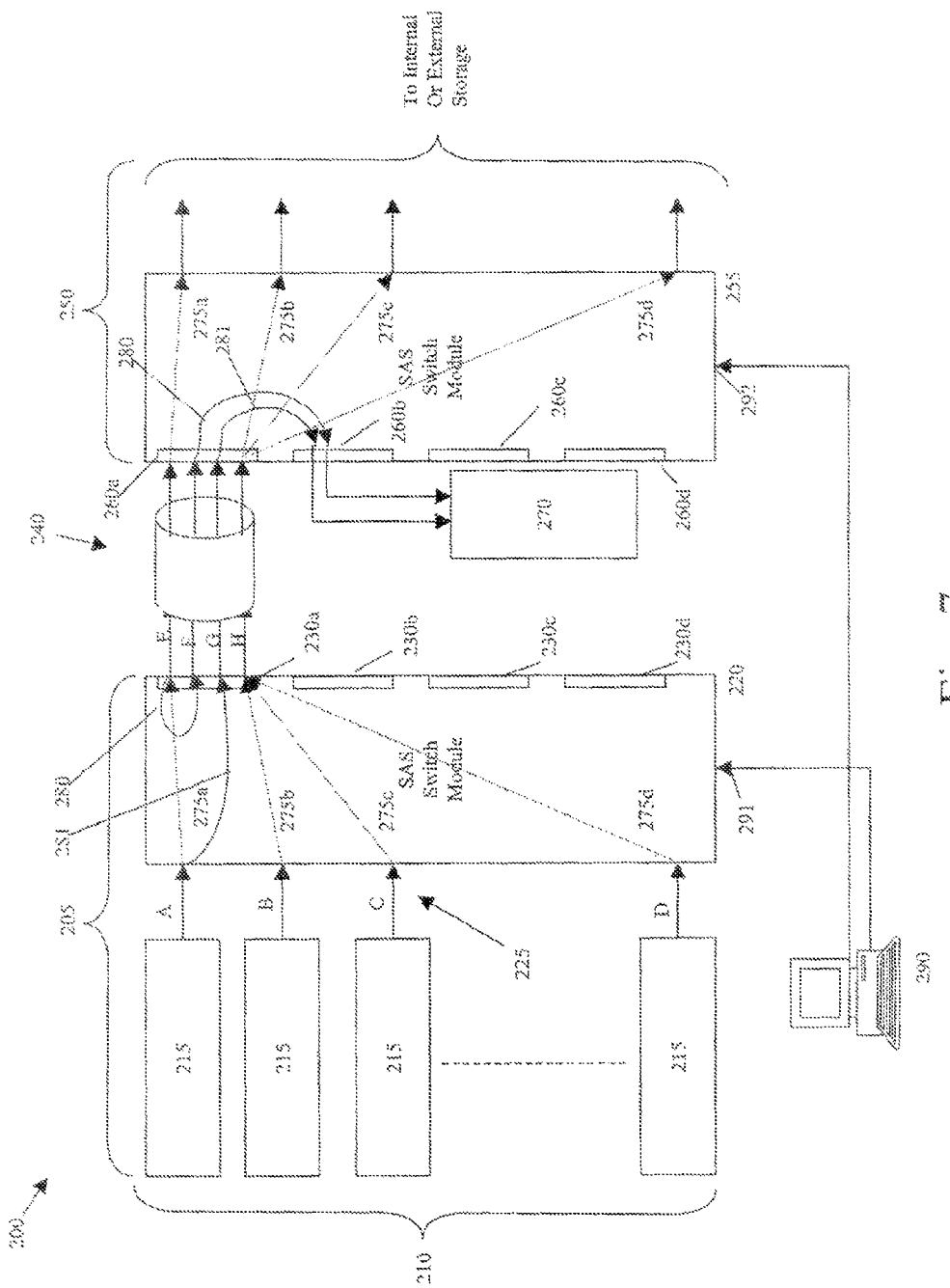
FIG. 7 illustrates the example of the SAS storage network system of FIGS. 2 and 3 configured in accordance with alternate exemplary embodiments.

FIG. 7 illustrates the example of the SAS storage network system 200 of FIGS. 2 and 3 configured in accordance with alternate exemplary embodiments. As discussed above, if data stream 275a, for example, has already been identified as the data stream with a data failure, then all the other data streams 275b, 275c, 275d can be rerouted to link H. Similarly, this configuration can be done in real time during normal operation of the system 200 without any disruptions.

Figure 8:
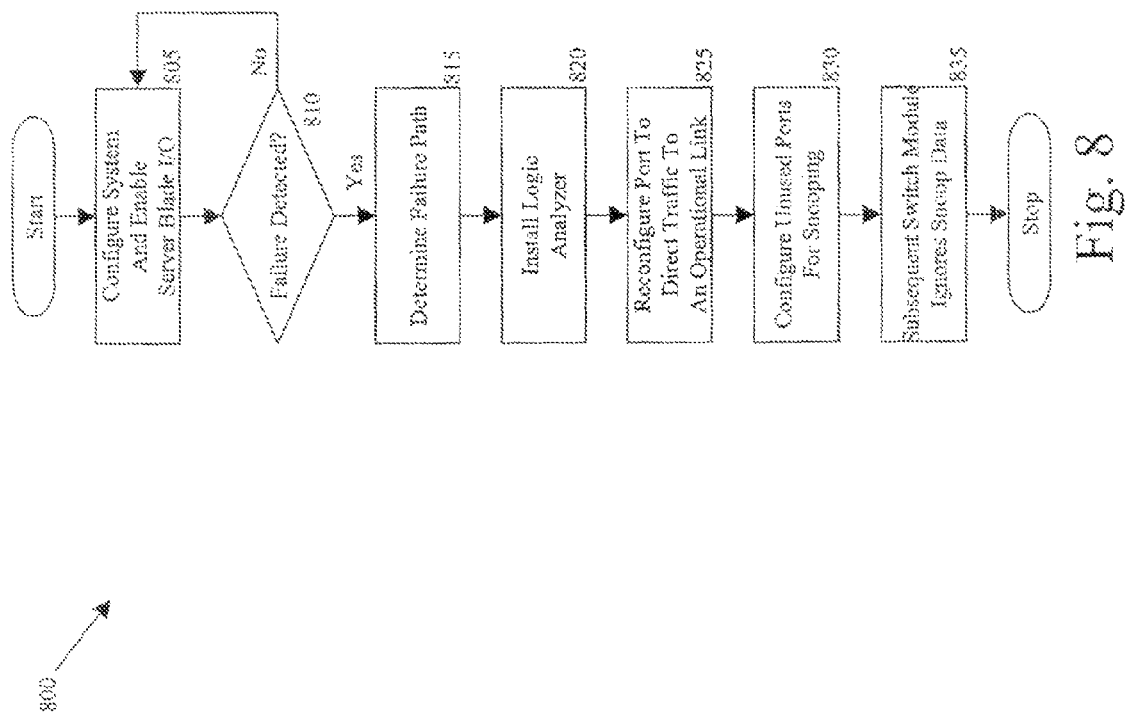
FIG. 8 illustrates a flow chart of an exemplary method for monitoring high-speed network traffic via simultaneously multiplexed data streams.

FIG. 8 illustrates a flow chart of an exemplary method 800 for monitoring high-speed network traffic via simultaneously multiplexed data streams. In accordance with exemplary embodiments, the system 200 is configured for operation and the independent server 215 I/O is configured at step 805. At step 810, it is determined whether or not a failure has occurred, which is generally a data fault failure as discussed above. If a failure is not detected, at step 810, then operation continues at step 805. If a failure has occurred at step 810, then the failure path is determined at step 815. It is appreciated that a failure is detected and the failure path is determined by the presence of faulty data along a particular path. As discussed above, the failure path can be a data link. At step 820, a logic analyzer 270 is coupled to the system 200. As discussed above, a snoop cable, or breakout cable can be installed in lieu of the external fabric 240 in accordance with FIGS. 4 and 5. Alternatively, the logic analyzer 270 can be coupled to a free wide port, such as wide port 260b, in accordance with FIGS. 6 and 7. At step 825, the data traffic 275a, 275b, 275c, 275d is rerouted to an operational link. As discussed above, all traffic 275a, 275b, 275c, 275d can be rerouted to a single link such as link A as discussed with respect to FIGS. 4 and 6. Alternatively, if the failed data path is successfully identified, such as data stream 275a, the remaining unaffected data streams traffic 275b, 275c, 275d can be rerouted to an operational link, such as link H, as discussed with respect to FIGS. 5 and 7. At step 830, the unused ports are configured for snooping. As discussed with respect to FIGS. 4-7, data links F, G are configured for snooping. Additionally, in accordance with FIGS. 6 and 7, wide port 260b is configured as a dedicated snooping part. At step 835, the snoop data streams 280, 281 are ignored by the subsequent switch module, which can be second switch module 255. It is appreciated that the method 800 continues as data faults and failures occur.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented, on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element trout another. Furthermore, the use of the terms a, an, etc. do not denote a limitation of quantity, but rather denote the presence of at least one of the referenced item.

What is claimed is:

1. A switch module system, comprising:
   a first switch module configured to be coupled to a first server chassis;
   a first data port disposed on the first switch module; and
   a set of first port data links configured to be coupled to additional sets of data port data links, the set of first port data links and the additional sets of data port data links being disposed in the first data port, each data link configurable to channel at least one of a normal data stream and a monitored data stream, wherein a data link configured to receive the monitored data stream is a monitor link for routing the monitored data stream for analysis, the normal data stream representing data prior to entering the first switch module, and the monitored data stream representing the data after leaving the first switch module, thereby isolating a fault related to the first switch module.

2. The system as claimed in claim 1 wherein a first data link is configured to receive channeled normal data streams routed from the first server chassis.

3. The system as claimed in claim 2 wherein a second and third data link are configured to channel monitored data streams.

4. The system as claimed in claim 3 wherein the second data link channels a monitored data stream prior to input into the first switch module.

5. The system as claimed in claim 4 wherein the third data link channels a monitored data stream output from the first switch module.

6. The system as claimed in claim 1 wherein a first data link is configured to receive a channeled failed data stream routed from a server disposed in the first server chassis.

7. The system as claimed in claim 2 wherein a second and third data link are configured to channel monitored data streams.

8. The system as claimed in claim 3 wherein the second data link channels a monitored data stream prior to input into the first switch module.

9. The system as claimed in claim 4 wherein the third data link channels a monitored data stream output from the first switch module.

10. The system as claimed in claim 6 wherein a fourth data link channels remaining normal data streams to a second switch module, wherein the first data port is configured to be coupled to a second data port disposed on the second switch module.

11. The system as claimed in claim 1 further comprising a logic analyzer coupled to the first switch module for monitoring the monitored data streams.

12. The system as claimed in claim 1 further comprising:
   a second switch module coupled to the first switch module via a subset of the set of data links; and
   a logic analyzer coupled to the second switch module for monitoring the monitored data streams.

13. The system as claimed in claim 1, further comprising:
   independent server modules disposed in the first chassis;
   a second switch module, wherein the first data port configured to be coupled to a second data port disposed on the second switch module;

a set of data links disposed between and coupled to the first switch module and the second switch module, a subset of the set of data links configured to receive monitored data streams and a second subset of data links configured to receive unaffected data streams; and a logic analyzer disposed between the first and second switch modules and being configured to receive the monitored data streams.

14. A non-transitory computer-readable medium having computer-executable instructions for performing a method, comprising:

configuring a multi-chassis system configured to support a server and a switch module to run data streams for the server and over the switch module;

detecting a data failure on at least one data link coupled to the switch module;

configuring a second and third data link coupled to the switch module, as monitor links to receive monitored data streams for analysis; and configuring at least one of the first data link and a fourth data link to support unaffected data streams, the unaffected data streams representing data prior to entering the switch module, and the monitored data streams representing the data after leaving the switch module, thereby isolating a fault in the monitored data stream to characterize the data failure, wherein the first, second, third and fourth data links are disposed on a data port on the switch module.

15. The non-transitory computer-readable medium as claimed in claim 14 wherein the method further comprises capturing the data failure on a logic analyzer.

16. The non-transitory computer-readable medium as claimed in claim 15 wherein the method further comprises discarding the monitored data stream in a second switch module in response to an analysis of the monitored data stream by the logic analyzer.

17. The non-transitory computer-readable medium as claimed in claim 15 wherein the logic analyzer is coupled to the switch module via a breakout cable, thereby receiving monitored data from the second and third data links.

18. The non-transitory computer-readable medium as claimed in claim 15 wherein the method further comprises configuring a wide port on a second switch module to receive the monitored data streams from the second and third data links.

19. The non-transitory computer-readable medium as claimed in claim 18 wherein the logic analyzer is coupled to a wide port on a second switch module, and is configured to receive the monitored data streams.

20. A switch module data monitoring method, comprising:

configuring a multi-chassis system to run data streams over a switch module interconnecting the multi-chassis system;

detecting a data failure on at least one data link coupled to the switch module;

configuring a second and third data link coupled to the switch module, as monitor links to receive monitored data streams for analysis;

configuring at least one of the first data link and a fourth data link to support unaffected data streams, the unaffected data streams representing data prior to entering the switch module, and the monitored data streams representing the data after leaving the switch module, thereby isolating a fault in the monitored data stream to characterize the data failure; and routing the monitored data streams to a logic analyzer in order to compare the unaffected and monitored data streams to characterize the data failure, wherein the first, second, third and fourth data links are disposed on a data port on the switch module.

* * * * *